Aug. 1, 1939.   B. C. CHANDLER   2,167,925
WELDING SMALL TIPS TO BASES
Filed Aug. 12, 1938   4 Sheets-Sheet 1
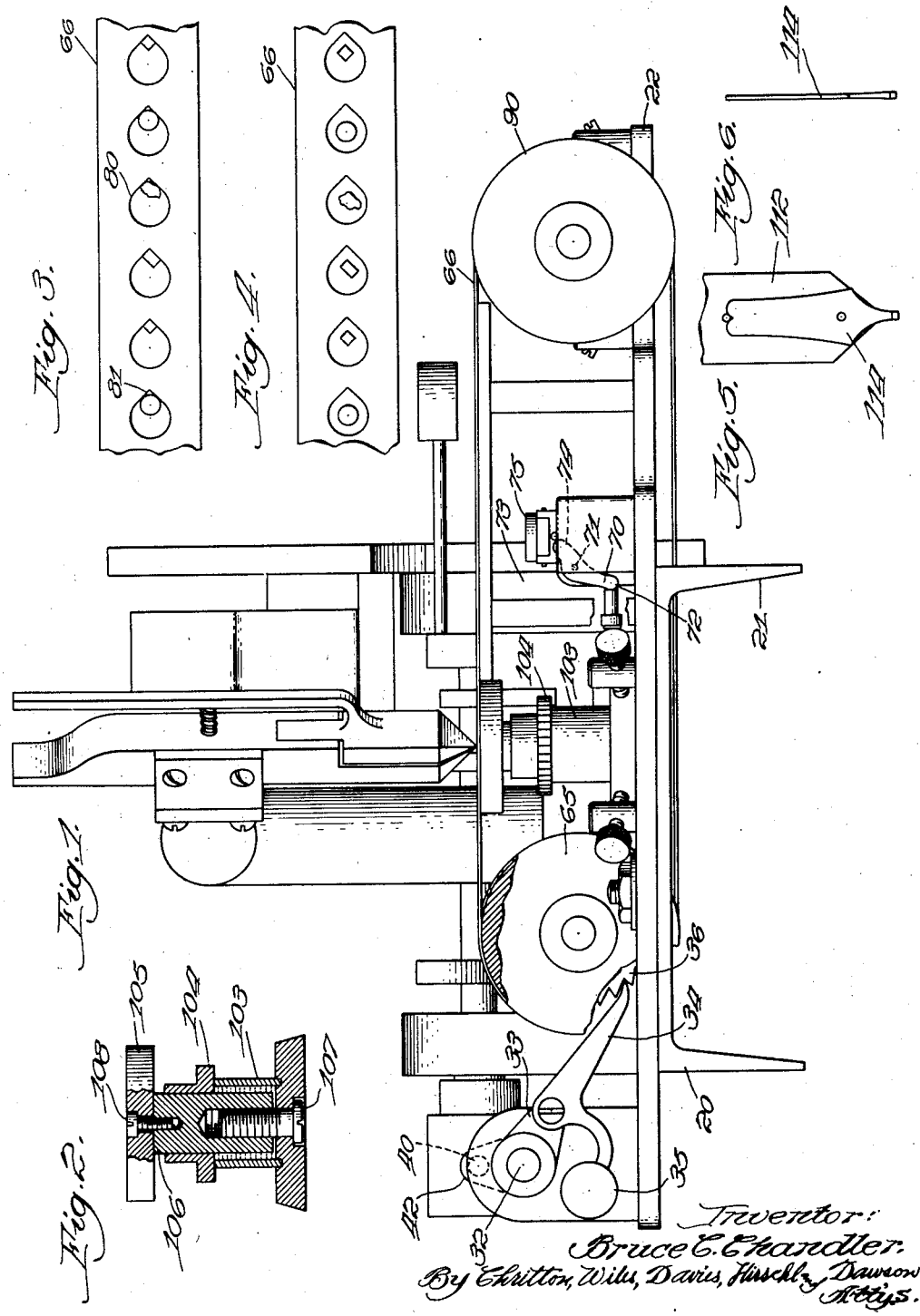

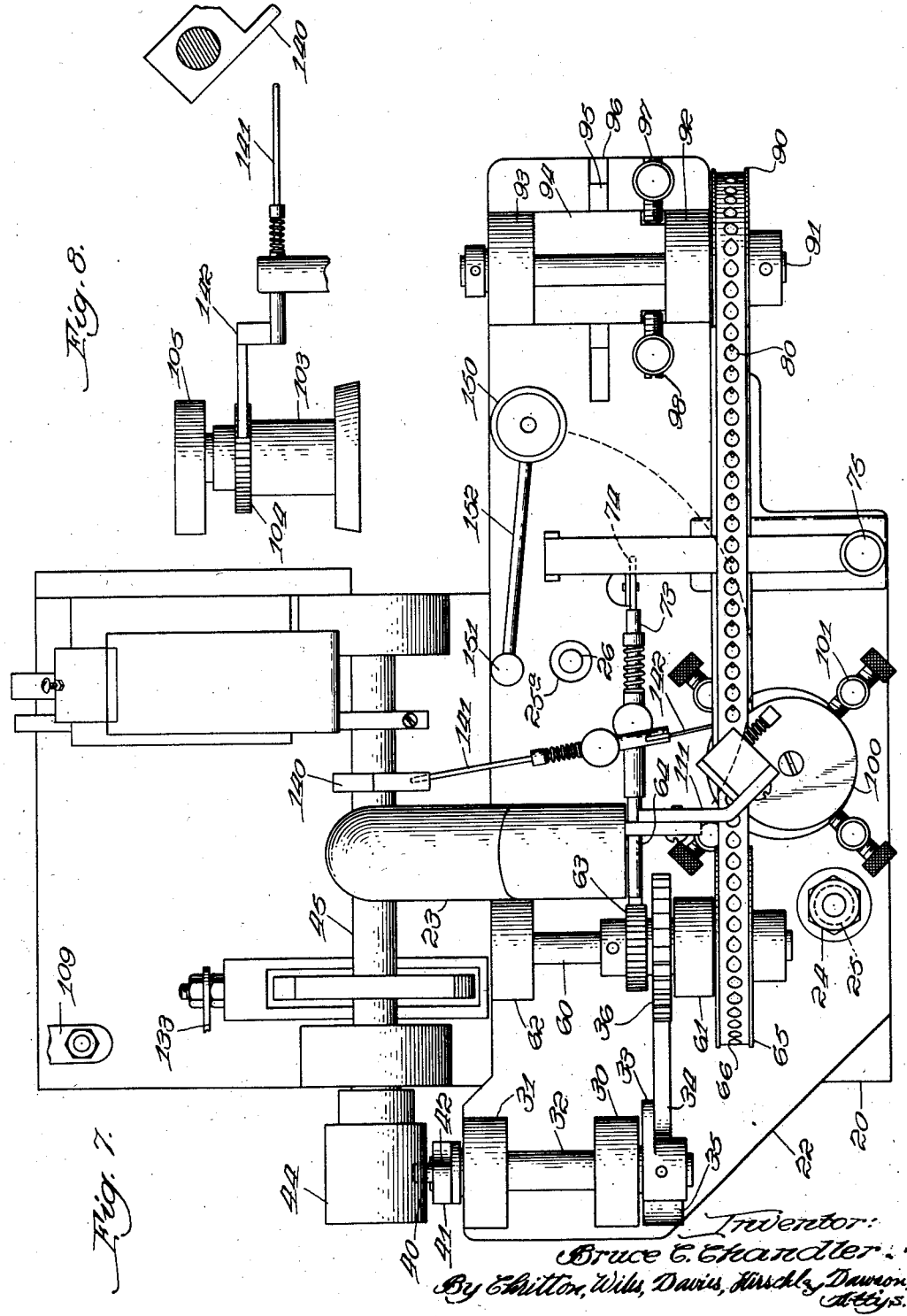

Aug. 1, 1939. B. C. CHANDLER 2,167,925
WELDING SMALL TIPS TO BASES
Filed Aug. 12, 1938 4 Sheets-Sheet 3
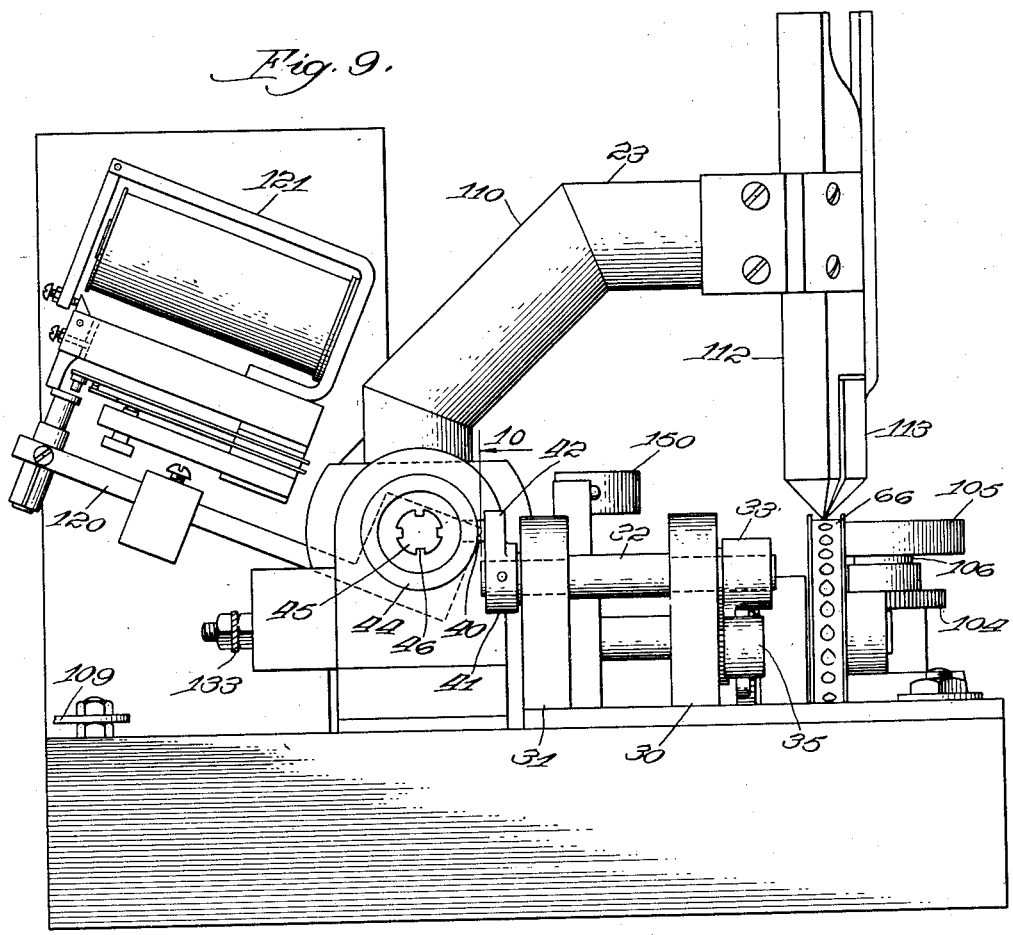
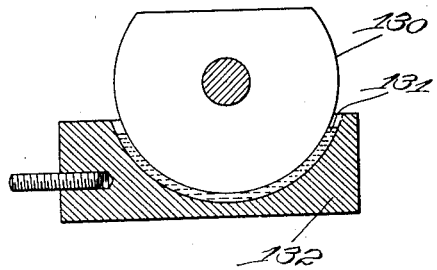
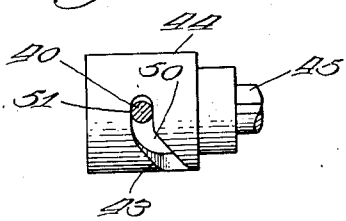
Inventor:
Bruce C. Chandler.
By Chitton, Wiles, Davies, Hirschl & Dawson
Attys.

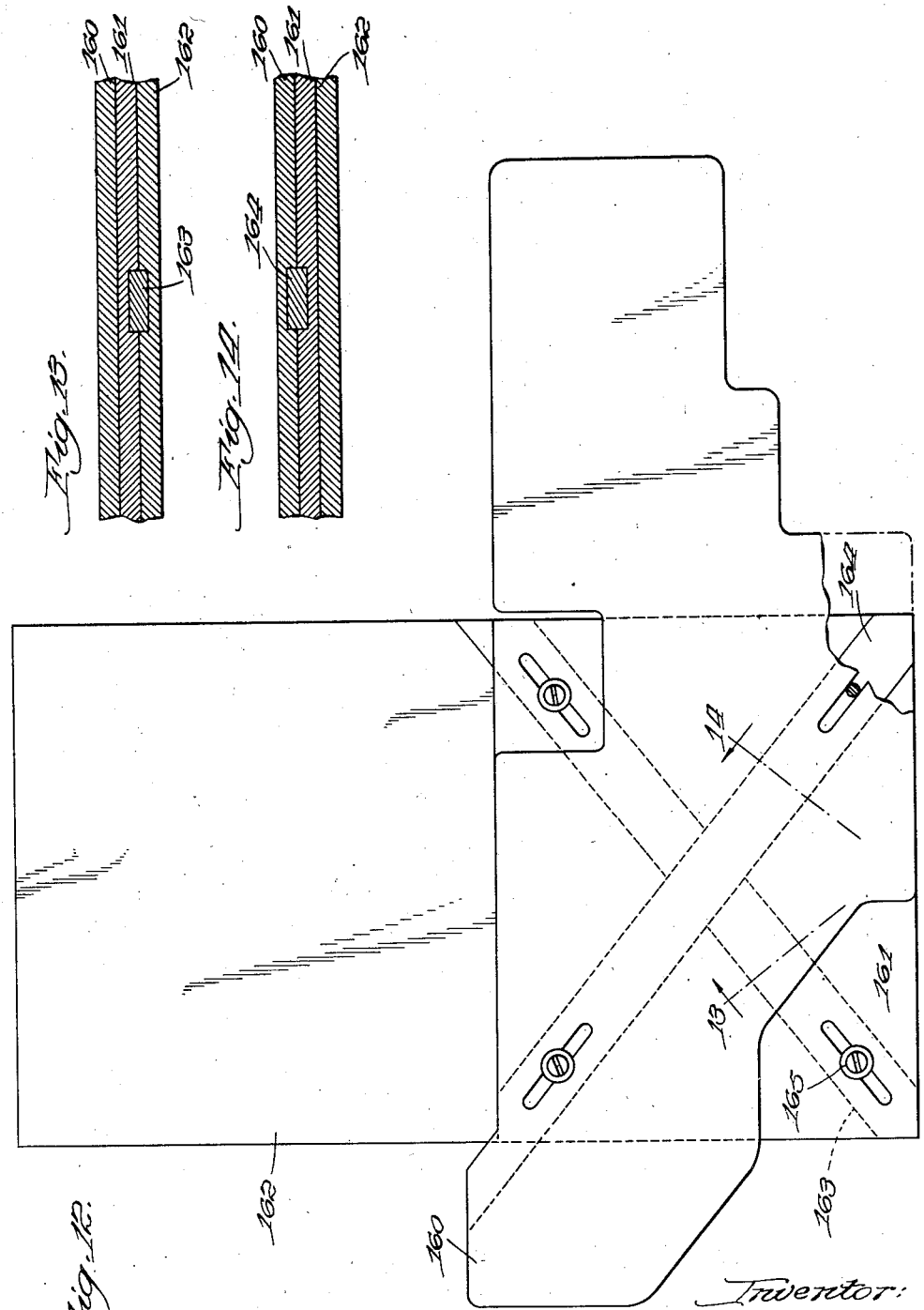

Patented Aug. 1, 1939

2,167,925

UNITED STATES PATENT OFFICE 2,167,925

WELDING SMALL TIPS TO BASES

Bruce C. Chandler, Waukegan, Ill., assignor to Pfanstiehl Chemical Company, a corporation of Illinois Application August 12, 1938, Serial No. 224,640

9 Claims. (Cl. 219—4)

This invention relates to an improvement in the welding of small tips to bases, and particularly is designed to be employed in connection with tip welding operations in which the base and tip are held in lightly pressed contact during the welding operation, for example, as shown in Pfanstiehl Patents Nos. 2,005,752 and 2,032,887.

In welding tips to small bases the handling of the tips is of considerable difficulty, because of their small size and high melting point. Heretofore feeding devices have been such as will feed only one tip at a time, the instrument being reset upon each occasion. The difficulty of providing a feeding device which may be charged with a plurality of tips at one time is readily understandable when it is considered that the usual tips are less than five hundredths of an inch in diameter, and that they must be brought into exact alignment with a pen nib having a point very little if any larger. Moreover, owing to the high melting point of the better grade of tips for pen purposes, it is quite advisable to employ a flux in connection with them and the feeding device must be such as not to clog with the flux.
This means that the feeding device should not be in contact with the tip at the moment of welding.

In accordance with the present invention, positioning means are employed which automatically feed a plurality of tips into precise alignment with a base-holding member, after which the feeding device is withdrawn slightly during the welding operation.

The invention is illustrated in the drawings, in which—

Figure 1 is a front elevation, partly in section, of the apparatus; Figure 2 is a sectional elevation of the tip-supporting member or anvil; Figures 3 and 4 are detailed plan views of the indentations in the feeding device, showing the shaping and the method of positioning; Figure 5 is a front view of a pen nib having a tip welded thereto; Figure 6 is a side view thereof; Figure 7 is a plan view corresponding to Figure 1; Figure 8 is a detailed elevation of the anvil and the method of rotating the same; Figure 9 is a side elevation corresponding to Figure 1; Figure 10 is a sectional elevation taken along the line 10 in Figure 9; Figure 11 is a detailed view of the cam member controlling the movement of the feeding device; Figure 12 is a plan view, partly in section and partly broken away, illustrating a modification of the adjusting means; and Figures 13 and 14 are sectional elevations taken as indicated perspectively by the lines 13 and 14 in Figure 12.

The welding features of the device, including the automatic cut-off and the wiring, are not here illustrated but are shown in detail in Pfanstiehl application Serial No. 126,712, filed February 19, 1937. The present invention includes no improvement in these features, but means are, of course, provided for passing a welding current through the tip and the base, and automatic means are provided for cutting off this current when the welding has been properly accomplished, as shown in Pfanstiehl Ser. No. 126,712.

The apparatus is provided with a base 20 mounted upon legs 21, upon which a mounting plate 22 is movably secured. The relative motion of the mounting plate 22 with reference to the base 20 and the base-holder 23 is secured by any suitable means such as a lock stud 24 passing through the base 20 and the plate 22, there being an opening indicated in Figure 7 by the dotted line 25 in the plate 22 of larger diameter than the diameter of the neck of the stud, thus permitting universal movement within the limits of the circle. Another opening 25a in plate 22 and corresponding opening 26 in the base 20 are likewise provided. A preferred adjusting means is shown in Figures 12, 13 and 14, this being indicated in a separate series of views for the sake of simplicity.

Upon the plate 22 are mounted supports 30 and 31 carrying a shaft 32, upon which is mounted the arm 33. At the end of the arm 33 a pawl 34 is pivotally mounted. A counter-weight 35 is provided on the pawl to keep it in contact with the ratchet gear 36. At the rear end of the shaft 32 is secured a ring 41 having an arm 42 at the end of which is carried an accentric pin 40, which engages a slot 43 in the cam 44. Cam 44 is splined upon shaft 45, which carries the base-holder 23. The cam 43 is free to move on the shaft 45 along the keys 46 as shown in Figure 9.

The position and form of the cam slot 43 is of extreme importance. The angular portion 50 thereof is quite sharp and is designed to carry the toggle mechanism to its dead center or point at which the pawl is farthest advanced (as shown in Figure 1) at a very early stage in the lowering of the base-holder 23. Thereafter the toggle mechanism is carried beyond dead center by further movement in the angular portion of the slot, but in this portion and in the straight portion 51, reversals of movement of the base-holder have no effect, the positioning or feeding means being perfectly free to be retracted, and, of course, in that portion of the movement of the cam wherein the pin is in the vertical section, the base-holder is perfectly free from interference thereby.

The ratchet gear 36 is mounted upon a shaft 60 carried by supports 61 and 62. A second ratchet gear 63 is likewise carried by the same shaft and is adapted to be moved by the pawl 64. Likewise carried by the shaft 60 is a wheel 65, which serves to carry the feeding strip or positioning member 66.

The pawl 64 is connected to the bell crank 70 (as shown in Figure 1) the crank being pivotally mounted at 71 and secured at the end of arm 72 to the rod 73 and the end of arm 74 is directly beneath the switch key 75. Upon depression of the switch key the bell crank 70 forces the pawl 64 into engagement with the ratchet gear 63 and retracts the feeding strip 66 a distance less than the diameter of the indentations 80. Complete depression of a switch key 75 then closes the welding circuit.

The other end of the positioning strip 66 is carried by a second wheel 90 borne by shaft 91, which is journaled in supports 92 and 93. These supports are carried by a plate 94 having a depending member 95 positioned in the slot 96 in the plate 22. The position of the supports may thus be adjusted by the adjustment screws 97 and 98.

The feeding device 66 is provided with a plurality of uniformly spaced indentations 80, which preferably are in the form substantially of circles, which at their rear edge (in the direction of motion) are cut away to form the right angled or converging portion 81, which serves to position a pellet held in the indentation. The positioning effect of the converging portion is illustrated in Figure 3, in which it is shown how, respectively, spherical, square, rectangular, and irregular tips are centered by contact with this converging strip during movement of the belt. In Figure 4 the position of the pellet upon retraction due to pawl 64 is illustrated. It will be noted that the center of each pellet is not in the same position, but the device is intended to act at any one period with pellets of the same general conformation and for each of these the center will be brought to a predetermined point. The relationship of this point to the base-holder may be adjusted by the adjustments of the studs 25, as heretofore explained, with or without adjustment of the supports 92 and 93 and the supporting anvil 100, which will be described later.

The feeding mechanism preferably is of stainless steel, thin enough to be flexible, and the indentations particularly are preferably carried all the way through the belt. Teeth may be provided in the wheel 65, if desired, but other frictional means may be employed in their stead.

If desired, a continuous belt may be replaced by a straight strip.

The welding anvil or tip support 100 may be adjustably secured upon the plate 22, as by means of adjusting screws 101. The anvil comprises a pedestal 103 carrying an annular ratchet gear 104, and having at its top a copper support 105. The gear 104 is secured to the shaft 106 to which the support 105 is fastened. The support 105 is eccentrically mounted with respect to the shaft 106, so that it turns to describe an eccentric path with reference to the base-holder 23. By loosening the screw 107 or 108, the support may be adjusted to describe a different path.

An appropriate electrical connection 109 is connected to the support.

The base-holder 23 comprises an arm 110 carrying the angle bracket 111 upon which are mounted the jaws 112 and 113 adapted to hold a pen nib 114 (as shown in Figure 6).

It is important that the jaws be at an angle to the direction of movement of the feeding device 66 in order that rectangular tips be properly centered upon the nib. This necessity does not exist with a spherical point.

Likewise carried upon the shaft 45 is the counter-balance 120 which also includes automatic cutting off mechanism 121 for stopping the welding current after the pen nib has fallen a pre-determined distance due to melting of metal. The operation of the cut-off means is no part of this invention and is here illustrated diagrammatically only. A full description of the mechanism will be found in Pfanstiehl Serial No. 126,712.

Likewise mounted upon shaft 45 is a mercury switch comprising a copper contact element 130 which dips into a mercury bath 131 in the metallic base 132. An electrical connection 133 is provided thereto.

A cam 140 is carried by the shaft and engages the arm 141 of the spring pawl 142, so that upon lifting of the base-holder the gear 104 is advanced one notch and the support 105 slightly rotated to provide a different support for the next succeeding tip.

A flux box 150 is pivotally mounted at 151 upon the arm 152 and is adapted to swing into position beneath the path of movement of the base-holder, so that after a pen nib has been placed in the base-holder, it may be dipped in the flux held in the box 150. A stop (not shown) may be provided in a known manner to limit the movement of the flux box, so that it will not pass beyond the path of the base-holder. As shown in Figure 9, the flux box is located at a low point and the shape of the cam slot 43 is so adjusted that movement of the base-holder to carry a tip into and out of the flux box will not affect the then position of the belt 66. As actually employed, the entire last half of the movement of the base-holder does not affect the position of the belt.

In Figures 12, 13 and 14, a preferred adjustment for the base is shown. In this form, the positioning device and its supports are carried upon a plane 160 which is separated from the base 162 by a slide plate 161. A slide member 163 is positioned in a slot common to plates 161 and 162 and a second slide member 164 is positioned in a slot common to plates 160 and 161. As shown in Figure 12, these two slide members are at right angles to each other, and movement along the two slides provides universal adjustment. Set screws 165 may be provided to hold the plates in position.

In operating the device a plurality of pellets are placed in the indentations, particularly as illustrated in Figure 1, and the base-holder lowered into position, this operation advancing the belt 66 by movement of the pawl 44 and bringing a tip pellet directly beneath the base-holder. With any particular type of tip pellet, the position of the belt is adjusted by movement of the plate, upon which it is mounted, and the pin 40 is long enough to permit considerable movement in and out and thus permit forward and back adjustment, while the splining of the shaft upon the cam 45 permits lateral movement.

After the base-holder has been lowered into contact with the tip element the switch key 75 is depressed which forces the pawl 64 into engagement with the ratchet 63 and moves the belt backwardly not more than one-half the diameter of the indentations 80, thus bringing the pellets into the position shown in Figure 4. It will be noted that square pellets are advanced at an angle of 45° to the line of movement, while the nibs are held in the holder at the same angle due to the angle of the bracket 111. This permits a square tip to be attached flush with the pen nib (as shown in Figures 5 and 6).

After the switch key has moved the belt backwardly, it is depressed further and starts the welding current, which is then automatically reduced after the desired amount of melting has been accomplished. It has been discovered that with many types of gold bases with the form of attachment shown in Figures 5 and 6, that the resistance is so much less after initial melting that no cut-off is necessary.

After the welding is complete the switch key is released, the base-holder lifted and the pen point removed and another blank inserted and the operation repeated. The indentations 80 are filled with tip pellets from time to time. The operator particularly has one hand free while depressing the switch key.

In many instances where high melting point tips are employed in combination with a gold nib the flux box 150 is swung over beneath the base-holder which then dips the nib into it, after which the holder is lifted slightly, the flux box removed, and the operation continued as before.

The foregoing detailed description has been given for clearness of unstanding only, and no unnecessary limitations should be understood therefrom, but the appended claims should be construed as broadly as permissible in view of the prior art.

I claim:

1. In a tip welding machine adapted to weld small tips to bases and provided with means for passing a welding current through tip and base; a movably mounted base-holder; a tip-supporting member; a positioning member associated with the base-holder and tip-supporting member provided with a series of spaced indentations; means for advancing the positioning member to move a tip in an indentation to a predetermined position below the base-holder; and means for retracting the positioning member a distance less than the width of an indentation.

2. A tip welding machine as set forth in claim 1, in which the means for advancing the positioning member are operated by movement of the base-holder, and the means for retracting the positioning member are operated by movement of a switch key initiating the welding current.

3. In a tip welding machine: a pivotally mounted base-holder; a slotted cam associated therewith; a toggle mechanism operated by motion of the cam and including a pawl, said pawl being moved to its point of maximum advancement by movement of the base-holder a distance considerably less than its entire distance of movement; a tip-supporting member; a positioning member provided with a series of spaced indentations adapted to position a tip element held therein; a ratchet adapted to advance the positioning member and operatively associated with the pawl; and means for retracting the positioning member a distance less than the width of an indentation.

4. A tip welding apparatus as set forth in claim 3, in which the toggle and cam and base-holder are so correlated as to permit a considerable free distance of movement to said base-holder as it approaches the positioning member.

5. Apparatus as set forth in claim 1, in which the supporting member is rotatable upon an eccentric axis, and in which means are provided for rotating the tip-supporting member operable by movement of the base-holder.

6. Apparatus as set forth in claim 3, in which the base-holder is mounted upon a shaft, the cam is splined upon the shaft, and the pawl is operated by a pin loosely held in a slot in the cam, said pin being substantially at right angles to the axis of the shaft, and said pawl and said positioning member being secured to a base which is adjustably mounted with respect to the base-holder.

7. In a tip welding machine; a pivotally mounted base-holder; a slotted cam associated therewith; a toggle mechanism operated by motion of the cam and including a pawl; said pawl being moved to its point of maximum advancement by movement of the base holder a distance considerably less than its entire distance of movement; a tip supporting member; a positioning member adapted to position a tip element by movement of the positioning member in contact with the tip; a ratchet adapted to advance the positioning member and operatively associated with the pawl; and means for retracting the positioning member.

8. Apparatus as set forth in claim 1, in which the face of the supporting member is rotatable, and in which means are provided for rotating the face of the tip supporting member operable by movement of the base holder.

9. In a tip welding apparatus for welding minute tips to a relatively large base, and in which the tip element is unconfinedly supported during the welding operation; a tip-supporting element having an upper face much larger than a tip, a base holder adapted to position a base at a predetermined spot immediately above the face of the tip-supporting element, the face of the tip-supporting element being provided with a large plurality of unconfined tip supporting positions and being movably mounted to permit progressive movement of the tip-supporting positions beneath the predetermined position of the base, and means for automatically positioning a tip upon the tip-supporting element directly below the predetermined base position.

BRUCE C. CHANDLER.